United States Patent [19]

Finney et al.

[11] Patent Number: 4,778,120

[45] Date of Patent: Oct. 18, 1988

[54] DUAL DRAG SYSTEM FOR SPIN CAST REELS

[75] Inventors: Lloyd M. Finney; Lorens G. Hlava; Steven L. Swisher, all of Tulsa, Okla.

[73] Assignee: Brunswick Corporation, Skokie, Ill.

[21] Appl. No.: 888,687

[22] Filed: Jul. 24, 1986

Related U.S. Application Data

[63] Continuation-in-part of Ser. No. 741,627, Jun. 5, 1985, abandoned.

[51] Int. Cl.$^4$ .............................................. A01K 89/02
[52] U.S. Cl. ....................... 242/84.5 A; 242/84.2 A
[58] Field of Search .................... 242/84.5 A, 84.51 A, 242/84.2 A

[56] References Cited

U.S. PATENT DOCUMENTS

| | | | |
|---|---|---|---|
| 2,988,298 | 6/1961 | Pursell | 242/84.5 A |
| 3,006,573 | 10/1961 | Holahan, Jr. | 242/84.5 A |
| 3,020,665 | 2/1962 | Hull | 242/84.51 A |
| 3,044,730 | 7/1962 | Yeada | 242/84.5 A |
| 3,120,357 | 2/1964 | Wood, Jr. | 242/84.5 A |
| 4,156,510 | 5/1979 | Hull | 242/84.5 R |
| 4,408,729 | 10/1983 | Moss et al. | 242/84.5 A |
| 4,522,347 | 6/1985 | Swisher | 242/84.5 A |
| 4,696,437 | 9/1987 | Yoshikawa | 242/84.2 A X |

Primary Examiner—Stuart S. Levy
Assistant Examiner—Joseph J. Hail, III
Attorney, Agent, or Firm—Wood, Dalton, Phillips, Mason & Rowe

[57] ABSTRACT

A dual drag mechanism is provided for use in a spin cast reel having a body portion with a deck plate, a forwardly extending hub associated with the body portion, and a spool supported on the hub fowardly of the deck plate for rotation about an axis lengthwise of the reel. In one embodiment of the invention, a drag plate includes a body portion supported between the deck plate and the spool for applying pressure to the spool. The drag plate is anchored to the deck plate at a first point radially of the hub. A first drag actuating device is provided for engaging the drag plate at a second point radially of the hub and angularly of the first point, and including a first manually manipulatable actuator movable in a plane generally transverse to the reel axis. A second drag actuating device is provided for engaging the drag plate at a third point radially of the hub and angularly of the first and second points, and including a second manually manipulatable actuator movable in a plane generally parallel to the reel axis. In another embodiment of the invention, a first drag actuating device is provided operatively associated with the spool for applying pressure to the spool. A second drag actuating device is provided for applying increased pressure directly to the spool. In both embodiments, the first and second drag actuating devices are maintained in actuating condition until moved or released.

19 Claims, 3 Drawing Sheets

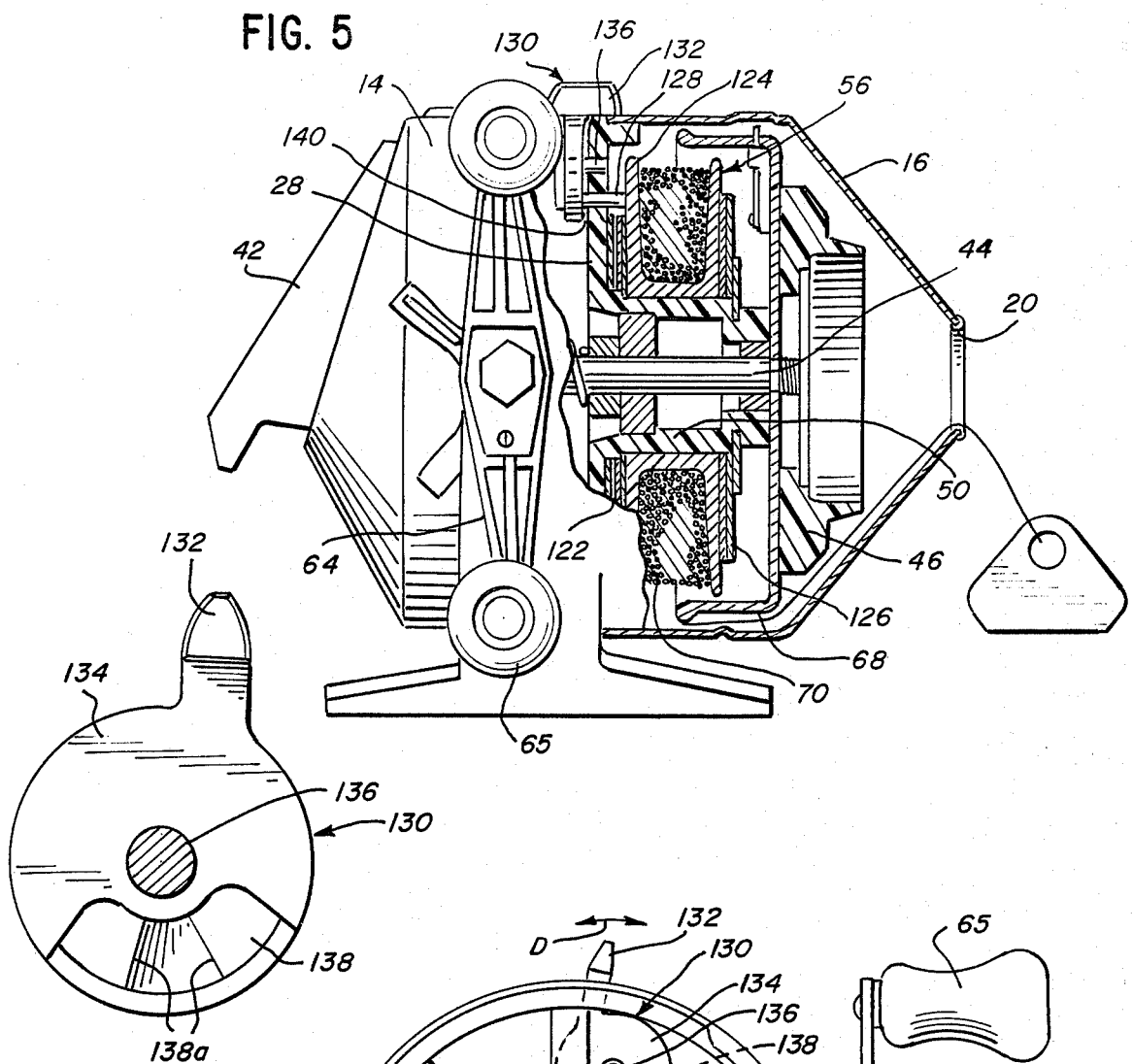
FIG. 5
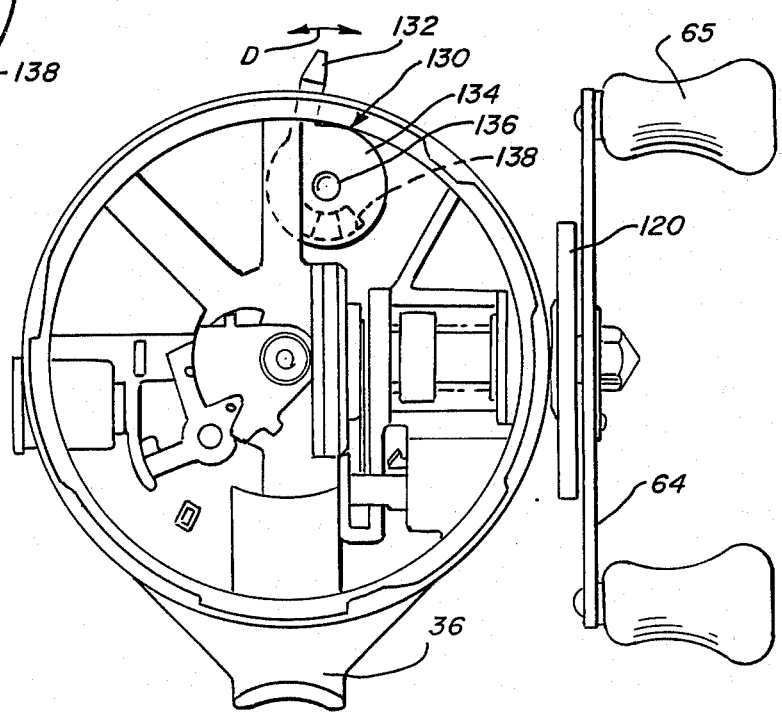
FIG. 7
FIG. 6

DUAL DRAG SYSTEM FOR SPIN CAST REELS

RELATED APPLICATION

This is a continuation-in-part of application Ser. No. 741,627, filed June 5, 1985 and now abandoned.

BACKGROUND OF THE INVENTION

This invention relates to spin cast style fishing reels and, particularly, to a drag system for varying the drag on the line spool.

Spin cast-type fishing reels have had many different styles and types of drag assemblies for varying tension in a line. One such device is shown in U.S. Pat. No. 4,408,729 to Moss et al., issued Oct. 11, 1983, wherein a star wheel is used to rotate a threaded post which moves a drag actuator in a radial direction along a ramp cam on a drag plate. The location of the drag actuator on the cam determines the amount of drag force applied to the spool. U.S. Pat. No. 3,088,691 to Hull, issued May 7, 1963, also shows a star wheel used to translate an actuator which pivots a pair of links to close a brake sleeve around a hub. The drag is controlled by the degree of binding of the sleeve on the hub.

Another type of drag assembly is shown in U.S. Pat. No. 3,481,554 to Hull, issued Dec. 2, 1969, wherein a thumb wheel actuator mechanism is employed. The thumb wheel is used to pivot links to open and close a brake member on the spool to vary the drag on the spool.

The above items of prior art are but a small example of many varieties and types of drag assemblies for controlling line tension. However, it can be seen that in each instance the drag assembly includes only a single drag actuating mechanism. Furthermore, most of the mechanisms are gradually adjustable for somewhat infinitely controlling line tension, such as using a star wheel in combination with a rotatable threaded post. There may be circumstances where a more instantaneous drag actuation is desired and which is not provided by the aforesaid mechanisms. Consequently, this invention is directed to providing a dual drag system for spin cast reels in which more versatile drag functions are afforded.

SUMMARY OF THE INVENTION

An object, therefore, of this invention is to provide a new and improved dual drag system for spin cast reels for controlling line tension.

In the exemplary embodiments of the invention, the dual drag system incorporates mechanism usable in a spin cast reel having a body portion with a deck plate, a forwardly extending hub associated with the body portion and a spool supported on the hub forwardly of the deck plate.

Generally, first drag means are provided operatively associated with the spool for applying pressure to the spool. First drag actuating means are provided for operating the first drag means and for providing controlled drag on the reel, including a first manually manipulatable actuator and means for maintaining the actuator in actuating condition when selectively moved. Second drag means are operatively associated with the spool for applying pressure to the spool independently of the first drag means. Second drag actuating means are provided for operating the second drag means and for providing instantaneous increased drag on the reel, including a second manually manipulatable actuator and means for positively retaining the second actuator in actuating condition until released.

In one embodiment of the invention, a drag plate is supported between the deck plate and the spool for applying pressure to the spool to limit rotation of the spool to circumstances only when the limit of tension exceeds the predetermined drag setting. The drag plate is anchored to the deck plate at a first point radially of the hub. First drag actuating means are provided for engaging the drag plate at a second point radially of the hub and angularly of the first point, and including a first manually manipulatable actuator movable in a plane generally transverse to the reel axis. Second drag actuating means are provided for engagement with the drag plate at a third point radially of the hub and angularly of the first and second points, and including a second manually manipulatable actuator movable in a plane generally parallel to the reel axis. The aforesaid first, second and third points are defined by rearwardly projecting tabs formed integrally with the drag plate generally at the periphery thereof.

In the preferred form of the first embodiment, the first drag actuating means includes an externally threaded post received in the deck plate and axially movable toward and away from the drag plate against the second tab. The first actuator comprises an internally threaded thumb wheel threaded onto the post. The thumb wheel is rotatable in the generally transverse plane.

The second drag actuating means includes a piston received in the deck plate and axially movable toward and away from the drag plate against the third tab. The second actuator comprises a lever operatively associated with the piston for moving the piston. The lever is pivotable in the generally parallel plane. An eccentric cam is movable with the lever about the pivot axis of the lever for engaging a rear end of the piston. The lever is located immediately adjacent a crank arm of a crank drive mechanism mounted on a reel body. The crank arm is rotatable about an axis generally perpendicular to the lengthwise axis of the reel, and the pivot axis of the lever is concentric with the axis of rotation of the crank arm.

A feature of the first embodiment of the invention includes audible indicating means operatively associated with the second drag actuating means for rendering an audible signal responsive to actuation of the second drag actuating means. In the exemplary embodiment of the invention, the audible indicating means comprises a spring-like clicker member recessed within the rear end of the piston of the second drag actuating means. The clicker member engages a serrated surface about the periphery of the cam which moves the piston. The bite of the clicker member into a valley between adjacent serrations serves to hold the cam and drag in that position thereby preventing the cam from backing off and releasing the drag.

In another embodiment of the invention, the second drag actuating means includes a piston-like pressure applying member mounted for free movement in the deck plate generally parallel to the reel axis, and an actuator in the form of a rotatable cam member movable in a plane generally transverse to the spool axis. The piston-like pressure member directly engages the spool at one end, and the rotatable cam member engages the pressure member at the opposite end. High friction means are provided between the pressure member and the spool to effect a complete stoppage of the spool if desired.

From the foregoing, it can be seen that the first drag actuating means provides a controlled adjustment of line tension, whereas the second drag actuating means provides a more instantaneous control of drag, and even stoppage of the spool.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 5 is a fragmented side elevational view, partially in section, of another embodiment of the invention;

FIG. 6 is a fragmented rear elevational view of the reel of FIG. 5; and

FIG. 7 is an elevational view, on an enlarged scale, of the actuator-cam member of the reel of FIGS. 5 and 6.

DETAILED DESCRIPTION OF THE PREFERRED EMBODIMENT

Figure 1:
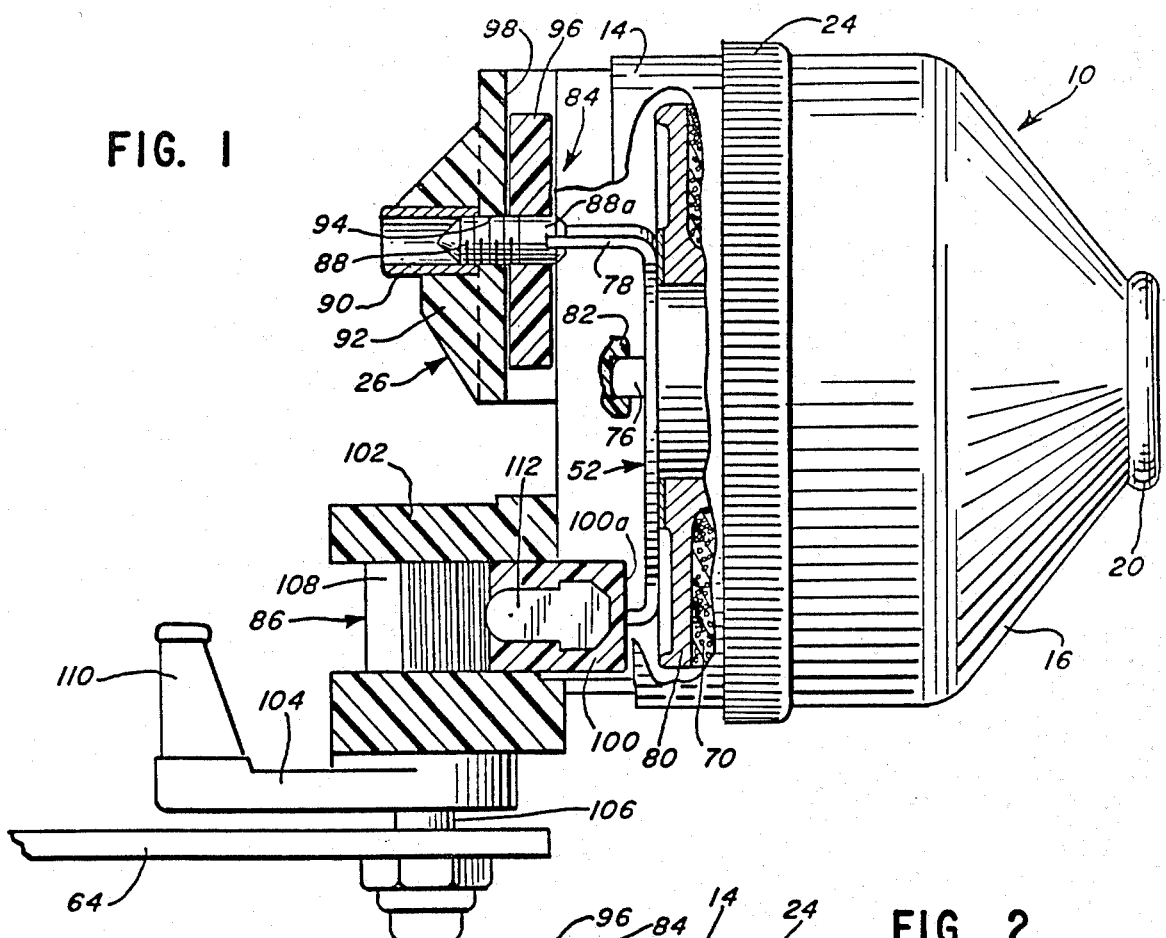
FIG. 1 is a fragmented top plan view, partially in section, of a spin cast reel incorporating one embodiment of the dual drag system of this invention.
Figure 2:
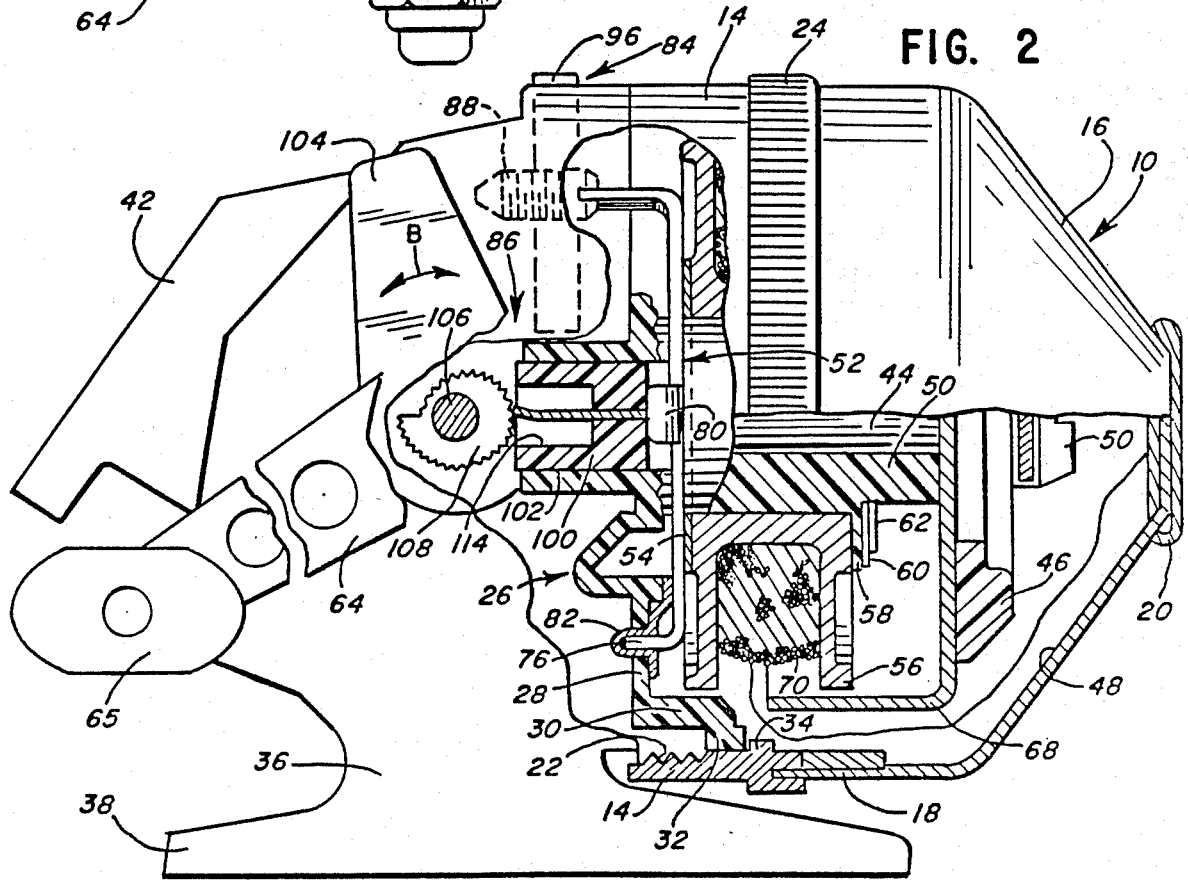
FIG. 2 is a fragmented side elevational view, partially in section, of the spin cast reel of FIG. 1.

Referring to the drawings in greater detail, FIGS. 1–4 illustrate one embodiment of the invention, and FIGS. 5–7 illustrate another embodiment of the invention. Referring first to FIGS. 1 and 2, there is shown a spin cast style fishing reel including a closed face housing having a two-part front cup-shaped cover, generally designated 10, and a rear cup-shaped cover, generally designated 12. The front cover has a ring or cylindrically-shaped first part 14 and a cone-shaped second part 16. The coneshaped second part has a generally annular rearward edge portion engaging in a forwardly facing locking groove 18 (FIG. 2) formed on the ring or cylindrically-shaped first part 14. The second part also has a circular line opening which mounts an annular line guide 20 in a known manner. The cylindrical first part 14 of the front cover 10 has helical threads 22 formed on the rearmost internal surface thereof and has an annular knurled gripping portion 24 formed on the external surface thereof. Threads 22 mate with threads formed on the front, external peripheral surface of rear cover 12.

A reel body, generally designated 26, is provided and includes a generally circular mounting plate or deck plate 28 which has a forwardly extending cylindrical sleeve portion 30 integrally formed around the outer periphery thereof. The forward edge of sleeve 30 has a flange 32 extending radially outwardly beyond the outer surface of sleeve portion 30. The cylindrical first part 14 of front cover 10 is provided with a rearwardly facing shoulder 34 axially spaced forwardly from the end of internal threads 22. The rear cover 12 has a cut out for the passage of the crank shaft when the reel body 26 is assembled with the rear cover. The reel body 26, with radially extending flange 32, is inserted into the front opening of the rear cover with the flange 32 abutting the front edge of the rear cover. The front cover 10 is threaded onto the external threads on rear cover 12 until the rearwardly facing shoulder 34 engages the radially outwardly extending flange 32 to trap the reel body between the front cover and the rear cover. The rear cover has an integrally molded, radially extending stem 36 with a mounting foot 38 for attachment to the appropriate part of a fishing rod in known fashion.

The rear cover 12 has a rearwardly facing opening 40 (FIG. 3) that is substantially rectangular in shape for receiving a thumb button 42 provided with a serrated face. In known manner, depressing the thumb button moves a center shaft 44 (FIG. 2) and a brake member 46 forwardly to trap the fishing line between the brake member and an interior cone-shaped surface 48 of front cover 10 to prevent casting of the line from the reel. A screw 50 secures brake member 46 to the front of the shaft 44.

A central hub 50 is formed integrally with and projects forwardly of deck plate 28. Center shaft 44 extends through hub 50. A drag plate, generally designated 52, a back spool washer 54, a spool assembly 56, a front drag washer 58 and a front spool washer 60 all are retained on hub 50 by a spool retainer clip 62 which fits into a groove (not shown) on a reduced diameter front portion of the hub.

The reel includes a conventional crank drive mechanism mounted on the reel body 26 through the rear cover 12, and includes a crank arm 64 and handle 65. The crank arm is rotatable about an axis concentric with a cup gear 66 (FIG. 3) which is in mesh with a pinion gear 67 for rotating center shaft 44 and a spinner head assembly 68 (FIG. 2). The operative drive train between crank arm 64 and gear 66 and the center shaft and spinner head assembly are conventional and not shown in the drawings to avoid cluttering a clear illustration of the dual drag mechanism of this invention. Suffice it to say, rotation of the spinner head assembly winds the fishing line onto spool 56, as at 70.

Figure 4:
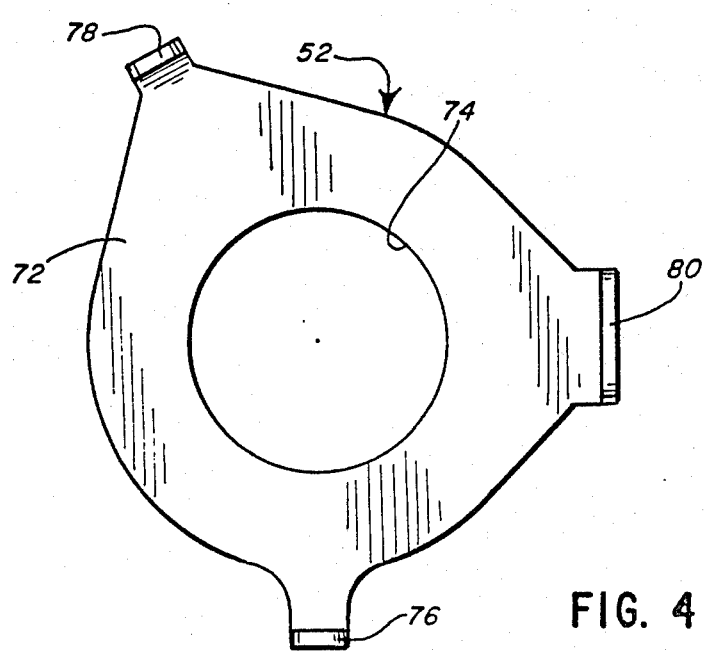
FIG. 4 is an elevational view of the drag plate of the reel of FIG. 1.

Reference now will be made to FIG. 4 before going into the details of the dual drag mechanism of the invention. In particular, FIG. 4 shows drag plate 52 to include a generally planar body portion 72 having a central opening 74 which surrounds hub 50. The drag plate has first, second and third rearwardly projecting tabs 76, 78 and 80, respectively, about the periphery of body portion 72. As can be understood from the foregoing, body portion 72 of the drag plate is sandwiched between deck plate 28 and spool 56 for applying pressure to the back side of the spool. It can be seen that tabs 76–80 are radially spaced from the hub and spaced angularly relative to each other about body portion 72.

Referring back to FIGS. 1 and 2, the angular disposition of tabs 76–80 relative to the interior components of the reel is clearly shown. First tab 76 is anchored to deck plate 28 by means of an anchoring bracket 82. Tab 78 is positioned for operative engagement by a first drag actuating mechanism, generally designated 84. Third tab 80 is positioned for operative engagement by a second drag actuating mechanism, generally designated 86.

Figure 3:
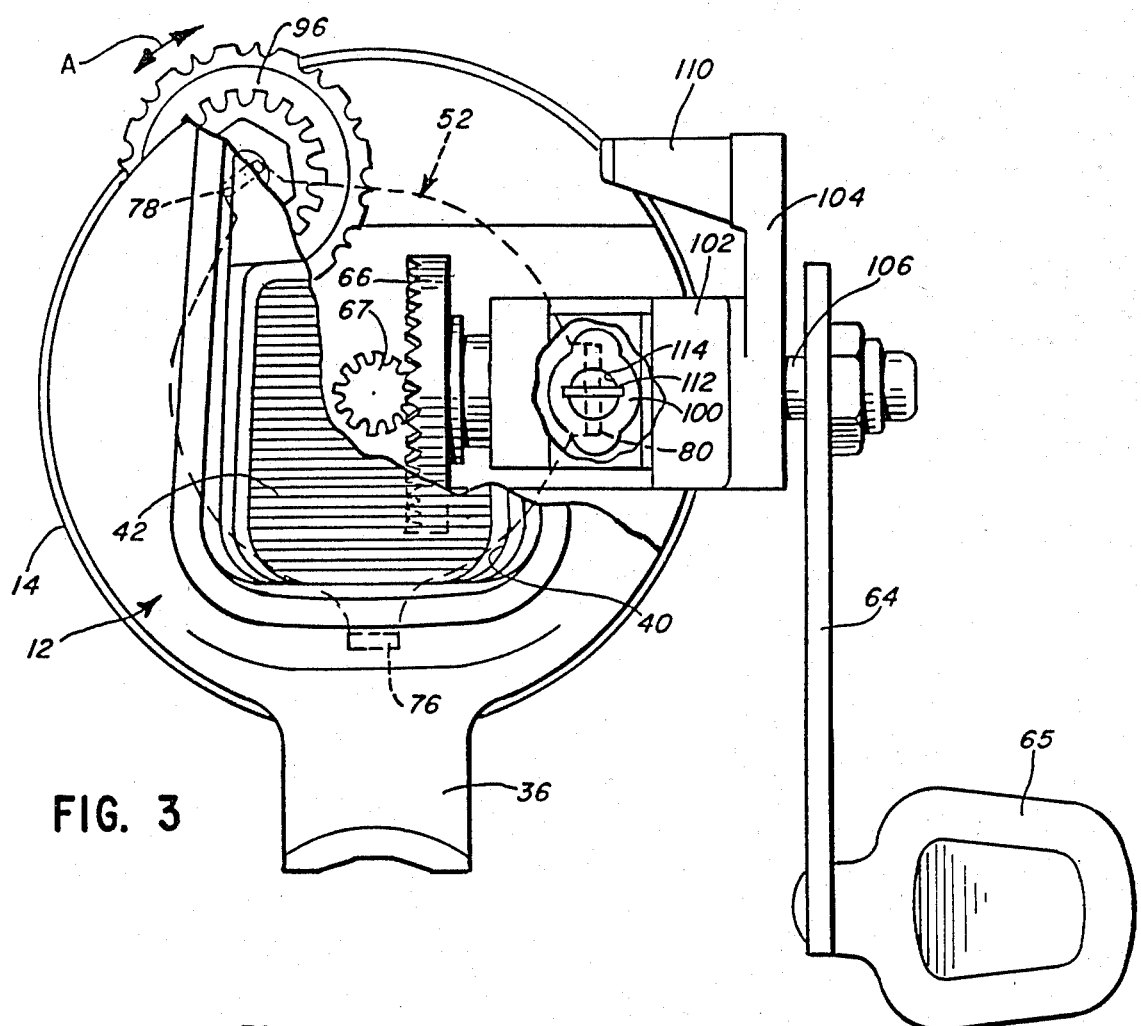
FIG. 3 is a fragmented rear elevational view of the spin cast reel of FIG. 1.

More particularly, first drag actuating mechanism 84 includes an externally threaded post 88 having a slotted forward end 88a for receiving second tab 78. Threaded post 88 is inserted through a bushing 90 staked into a rear boss construction 92 formed integrally with and projecting rearwardly of the deck plate of reel body 26. The post is axially reciprocally received in a bore 94 in boss 92 for axial movement toward and away from drag plate 52. An internally threaded thumb wheel 96 is captured within a slot 98 in boss 92 for threadingly embracing externally threaded post 88. It can be seen that the thumb wheel is rotatable or movable in a plane generally transverse to the lengthwise axis of the reel extending through center shaft 44 and hub 50. FIG. 3 shows that thumb wheel 96 is positioned within the reel body so as to be partially exposed for manual manipulation and rotation in the direction of doubleheaded arrow "A".

In view of the foregoing, it can be seen that the operation of first drag actuating mechanism 84 is such that rotation of thumb wheel 96 will cause externally threaded post 88 to move drag plate 52 toward and away from spool 56, through the engagement of the slotted front end of the post with second tab 78 of the drag plate. This drag actuating mechanism provides a more gradual and practically an infinite control of the drag on the spool and thereby controlling line tension.

The second drag actuating mechanism 86 is provided for engaging third tab 80 of drag plate 52 for more rapid control and substantially quick-release of the line tension. More particularly, drag actuating mechanism 86 includes a piston 100 mounted for axial reciprocation within a cylinderlike boss 102 formed integrally with and projecting rearwardly from deck plate 28. An inner or forward end 100a of the piston engages third tab 80 of drag plate 52. A manually manipulatable actuator in the form of a lever 104 is journalled on a shaft 106 having a transverse axis coincident with the axis of rotation of crank arm 64. The lever is movable back and forth in the direction of double-headed arrow "B" (FIG. 2) in a plane generally parallel to the lengthwise axis of the reel defined by center shaft 44 and hub 50. An eccentric cam 108 is formed integrally with lever 104. A transversely extending handle portion 110 projects inwardly of lever 104 as best seen in FIG. 1, for easy engagement as by an operator's thumb. It can be seen that the lever is located immediately adjacent crank arm 64 for actuation without the operator even removing his hand from the crank arm. As best seen in FIG. 2, eccentric cam 108 will move piston 100 toward drag plate 52 as lever 104 is rotated in a counterclockwise direction, i.e. in a pulling direction. Should a quick release of the drag be desired, rapid movement of lever 104 in a clockwise direction will cause the decreasing periphery of eccentric cam 108 to release piston 100 and thereby release the pressure on the drag plate. It also can be seen that the quick release direction of the lever is in the normal clockwise winding direction of crank arm 64. This arrangement also facilitates practically instantaneous drag release in conjunction with the location of lever 104 immediately adjacent to and on the inside of crank arm 64.

Audible indicating means are provided in operative association with second drag actuating mechanism 86 for rendering an audible signal responsive to actuation of the second drag actuating mechanism. More particularly, a leaf spring 112 is anchored at the base of a recess 114 in piston 100. At least a portion of the outer periphery of eccentric cam 108 is provided with a serrated surface. The distal end of leaf spring 112 engages the serrated surface of the cam. Therefore, on rotation of lever 104, and therefore, eccentric cam 108, a clicking audible sound is rendered by engagement of the leaf spring with the serrated peripheral surface of the cam. The leaf spring 112 also serves as a brake or retaining member for the cam. That is, the force of the spring between adjacent serrations, holds the cam in that position, thereby preventing the cam from backing down the slope and releasing the drag on the spool.

FIGS. 5-7 illustrate another embodiment of the invention wherein the audible indicating means has been eliminated and a second, rapid drag means is provided in direct operative association with the reel spool itself. Like the embodiments of FIGS. 1-4, both drag means are maintained or positively retained in their actuating condition until released. Like numerals have been applied to FIGS. 5 and 6 corresponding to like components in relation to the embodiment of FIGS. 1-4.

More particularly, the first drag means of the embodiment of FIGS. 5 and 6 is fairly conventional and substantially identical to that shown in U.S. Pat. No. 4,408,729 to Moss et al, dated Oct. 11, 1983, and assigned to the assignee of this invention. Generally, the first drag means includes a standard drag star wheel 120, a drag washer 122 sandwiched between deck plate 28 and a rear flange 124 of spool assembly 56 and a front drag washer 126. Star wheel style drag mechanisms are well known in the art and, for brevity purposes, will not be described herein. Suffice it to say, this first drag means provides controlled drag on the reel and further details can be derived from the aforesaid Moss patent which is incorporated herein by reference. As shown in Moss in relation to FIGS. 5 and 6, star wheel 120 acts through a post 127 to operate a drag actuator 129. As with Moss, the drag actuator engages a ramp cam (not shown) to effect a drag on drag washer 122.

The second drag means of the embodiment of FIGS. 5-7 include a pressure member in the form of a piston or plunger 128 mounted for free movement through deck plate 28 generally parallel to the reel axis. An actuator, generally designated 130, is provided for operating, i.e. axially moving, pressure plunger 128.

Actuator 130 includes a handle or thumb portion 132 exposed exteriorly of cover part 14 for manual pivoting movement in the direction of double-headed arrow "D" (FIG. 6). A circular or disc-shaped body portion 134 is located interiorly of the reel for rotation about a pivot pin 136. An arcuately shaped cam ramp 138 is formed in the face of body portion 134 of actuator 130 for engaging one end of pressure plunger 128. Body portion 134 is mounted in confined slot 140 within the reel so as to preclude axial movement thereof. Therefore, pressure plunger 128 provides a direct engagement between flange 124 of spool 56 and cam ramp 138 of actuator 130. As the actuator is rotated about pivot pin 136, the inclination of cam ramp 138 forces the pressure plunger into direct drag engagement with the spool. Cam ramp 138 is segmented, as at 138a, to provide a degree of incremented "feel" for the operator.

The drag mechanism of FIGS. 5-7 is designed to provide considerable drag force against rotation of the spool in order to completely stop or lock the spool. Although not shown in the drawings, this stoppage may be facilitated by providing a tip of resilient, high friction material on the end of pressure plunger 128 which engages the surface of spool flange 124. Alternatively, a nonresilient pressure plunger may be used and engageable with serrations or recesses formed on the engaging spool surface. When actuator 130 is "turned off" to cause the piston to back down ramp 138, the reel again is in its controlled, preset drag mode.

From the foregoing, it can be seen that a fisherman can preset the first drag means of either embodiment of FIGS. 1–4 or the embodiment of FIGS. 5–7, and maintain that drag as the controlling drag for the reel. When a fish strike occurs and line begins to pay out from the spool, the fisherman can actuate the second, instantaneous drag to increase the drag pressure and stop the reel, if desired, particularly in the embodiment of FIGS. 5–7. The second drag is maintained or positively retained in its actuated condition until released. Once the fish is boated, the fisherman can disengage the second drag and return the reel to the condition of the first, preset controlled drag mode.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a spin cast reel having a body portion with a deck plate, a forwardly extending hub associated with the body portion, and a spool supported on the hub forwardly of the deck plate for rotation about an axis lengthwise of the reel, a dual drag mechanism comprising:
   a drag plate including a body portion supported between the deck plate and the spool for applying pressure to the spool, means for pivotally anchoring the drag plate to the deck plate at a first point radially of the hub;
   first drag actuating means for engaging the drag plate at a second point radially of the hub and angularly spaced about said axis from said first point for providing controlled casting drag on the reel, including a first manually manipulatable actuator selectively movable in a plane generally transverse to said axis and means for maintaining the actuator in actuating condition when selectively moved; and
   second drag actuating means for engaging the drag plate at a third point radially of the hub and angularly spaced about said axis from said first and second points for providing instantaneous increased drag on the reel, including a second manually manipulatable actuator selectively movable in a plane generally parallel to said axis and means for positively retaining the second actuator in actuating condition until released.

2. In a spin cast reel as in claim 1 wherein said drag plate has transverse tabs defining said first, second and third points.

3. In a spin cast reel as in claim 1 wherein said first drag actuating means includes an externally threaded post received in the deck plate and axially movable toward and away from the drag plate at said second point, and said first actuator comprises an internally threaded wheel threaded onto the post, the wheel being rotatable in said generally transverse plane.

4. In a spin cast reel as in either of claims 1 or 3 wherein said second drag actuating means includes a piston received in the deck plate and axially movable toward and away from the drag plate at said third point, and said second actuator comprises a lever operatively associated with the piston for moving the piston, the lever being pivotable in said generally parallel plane.

5. In a spin cast reel as in claim 4, said second actuator further including an eccentric cam means movable with said lever about the pivot axis of the lever for engaging a rear end of the piston.

6. In a spin cast reel as in claim 5 wherein the means for retaining includes at least a portion of the peripheral surface of said cam is serrated, and including a clicker member engageable with the serrated surface for providing an audible clicking sound responsive to actuation of the second drag actuating means.

7. In a spin cast reel as in claim 6 wherein the rear end of said piston is recessed and the clicker member comprises a spring member mounted in the recessed end of the piston.

8. In a spin cast reel as in claim 4 wherein said reel includes a crank drive mechanism mounted on a reel body with a crank arm rotatable about an axis generally perpendicular to said lengthwise axis of the reel, said lever being located immediately adjacent the crank arm and the pivot axis of the lever being concentric with the axis of rotation of the crank arm.

9. In a spin cast reel as in claim 1, wherein the means for retaining includes audible indicating means operatively associated with said second drag actuating means for rendering an audible signal responsive to actuation of the second drag actuating means.

10. In a spin cast reel having a body portion with a deck plate, a forwardly extending hub associated with the body portion, and a spool supported on the hub forwardly of the deck plate for rotation about an axis lengthwise of the reel, a dual drag mechanism comprising:
    a drag plate including a body portion supported between the deck plate and the spool for applying pressure to the spool, the drag plate including three rearwardly projecting tabs spaced radially of the hub and spaced angularly relative to each other, a first of said tabs being anchored to the deck plate;
    first drag actuating means including a first axially movable member engageable with a second of said tabs for providing controlled casting drag on the reel, a first manually manipulatable actuator selectively movable in a plane generally transverse to said axis and operatively associated with the first axially movable member for moving the same, and means for maintaining the actuator in actuating condition when selectively moved; and
    second drag actuating means including a second axially movable member engageable with a third of said tabs for providing instantaneous increased drag on the reel, a second manually manipulatable actuator selectively movable in a plane generally parallel to said axis and operatively associated with the second axially movable member for moving the same, and means for positively retaining the second actuator in actuating condition until released.

11. In a spin cast reel as in claim 10 wherein the first axially movable member of said first drag actuating means comprises an externally threaded post received in the deck plate and axially movable toward and away from the drag plate, and said first actuator comprises an internally threaded wheel threaded onto the post, the wheel being rotatable in said generally transverse plane and the threads providing the maintaining means.

12. In a spin cast reel as in either of claims 10 or 11 wherein said second axially movable member comprises a piston received in the deck plate and axially movable toward and away from the deck plate, and said second actuator comprises a lever operatively associated with the piston for moving the piston, the lever being pivotable in said generally parallel plane.

13. In a spin cast reel as in claim 12, said second actuator further including an eccentric cam means movable with said lever about the pivot axis of the lever for engaging a rear end of the piston.

14. In a spin cast reel as in claim 13 wherein the means for retaining includes at least a portion of the peripheral surface of said cam is serrated, and including a clicker member engageable with the serrated surface for providing an audible clicking sound responsive to actuation of the second drag actuating means.

15. In a spin cast reel as in claim 14 wherein the rear end of said piston is recessed and the clicker member comprises a spring member mounted in the recessed end of the piston.

16. In a spin cast reel as in claim 12 wherein said reel includes a crank drive mechanism mounted on the reel body with a crank arm rotatable about an axis generally perpendicular to said lengthwise axis of the reel, said lever being located immediately adjacent the crank arm and the pivot axis of the lever being concentric with the axis of rotation of the crank arm.

17. In a spin cast reel as in claim 10, wherein the means for retaining includes audible indicating means operatively associated with said second drag actuating means for rendering an audible signal responsive to actuation of the second drag actuating means.

18. In a spin cast reel having a body portion with a deck plate, a forwardly extending hub associated with the body portion, and a spool supported on the hub forwardly of the deck plate for rotation about an axis lengthwise of the reel, a dual drag mechanism comprising:

a drag plate including a body portion supported between the deck plate and the spool for applying pressure to the spool, means for pivotally anchoring the drag plate to the deck plate at a first point radially of the hub;

first drag actuating means for engaging the drag plate at a second point radially of the hub and angularly spaced about said axis from said first point for providing controlled drag on the reel, including a first manually manipulatable actuator and means for maintaining the actuator in actuating condition when selectively moved; and second drag actuating means for engaging the drag plate at a third point radially of the hub and angularly spaced about said axis from said first and second points for providing instantaneous increased drag on the reel, including a second manually manipulatable actuator and means for positively retaining the second actuator in actuating condition until released.

19. In a spin cast reel having a body portion with a deck plate, a forwardly extending hub associated with the body portion, and a spool supported on the hub forwardly of the deck plate for rotation about an axis lengthwise of the reel, a dual drag mechanism comprising:

a drag plate including a body portion supported between the deck plate and the spool for applying pressure to the spool and for pivoting the drag plate on the deck plate at a first point radially of the hub;

first drag actuating means for engaging the drag plate at a second point radially of the hub and angularly spaced about said axis from said first point for providing controlled drag on the reel, including a first manually manipulatable actuator movable in a plane generally parallel to said axis and means for maintaining the actuator in actuating condition when selectively moved; and second drag actuating means including a pressure member movable generally parallel to said axis for directly engaging the spool at a third point radially of the hub and angularly spaced about said axis from said first and second points for providing instantaneous increased drag on the reel, a second manually manipulatable actuator for moving the pressure member and being movable in a plane generally transverse to said axis, and means for positively retaining the second actuator in actuating condition until released.

* * * * *